United States Patent [19]

Marchitto et al.

[11] Patent Number: 4,695,226
[45] Date of Patent: Sep. 22, 1987

[54] HELICOPTER ROTOR BACKUP DAMPER SYSTEM

[75] Inventors: Michael J. Marchitto, Orange; Louis R. Bocciarelli, Branford, both of Conn.

[73] Assignee: United Technologies Corporation, Hartford, Conn.

[21] Appl. No.: 697,705

[22] Filed: Feb. 4, 1985

Related U.S. Application Data

[63] Continuation-in-part of Ser. No. 549,389, Nov. 7, 1983, abandoned.

[51] Int. Cl.[4] ............................................. B64C 27/51
[52] U.S. Cl. ................................. 416/106; 416/140; 188/314
[58] Field of Search ............... 416/103, 104, 105, 106, 416/140, 107; 188/378, 282, 317, 318, 314; 280/14

[56] References Cited

U.S. PATENT DOCUMENTS

| | | | |
|---|---|---|---|
| 2,681,044 | 6/1954 | Eggenberger | 188/318 |
| 3,144,082 | 8/1964 | Grant et al. | 416/106 |
| 3,212,584 | 10/1965 | Young | 416/106 |
| 3,303,887 | 2/1967 | Pfleiderer | 416/105 |
| 3,972,396 | 8/1976 | Bochnak | 188/318 |
| 4,084,668 | 4/1978 | Rybicki | 416/106 |
| 4,305,284 | 12/1981 | Rubicki et al. | 73/302 |
| 4,521,202 | 6/1985 | Dakahama | 188/318 |

Primary Examiner—Robert E. Garrett
Assistant Examiner—John Kwon
Attorney, Agent, or Firm—Gerald E. Linden

[57] ABSTRACT

In a system having many unequal-area dampers (16) and a common main accumulator (34) for providing positive hydraulic pressure thereto, a shutoff valve (64) and a backup accumulator (62) are provided for each damper (16). In the event of a loss of pressure in the system, the shutoff valve (64) isolates each damper (16) and associated backup accumulator (62) from the rest of the system so that positive hydraulic pressure is provided to each associated damper (16).

6 Claims, 2 Drawing Figures

HELICOPTER ROTOR BACKUP DAMPER SYSTEM

This application is a Continuation-in-Part of application Ser. No. 549,389, filed Nov. 7, 1983.

TECHNICAL FIELD

This invention relates to damping systems and, more particularly, to those in a helicopter that employ unequal piston-area dampers.

BACKGROUND ART

The main rotor blades of a helicopter are subject to pitch changing movement, flapping, and lead/lag movement. Concerning the latter, it is known to provide a damper of the unequal piston-area type in a helicopter that also has blade folding, such as the Sikorsky Models CH53-D, H53-E and Seahawk SH60-B.

When the rotor is not turning, the damper functions as an actuator to position its associated blade against a lead (or lag) stop. This ensures that the blades are in a predetermined position prior to folding or, in the case of a water landing, ensures a balanced blade configuration. Fluid pressure is provided to the dampers by a pressurized oil accumulator. Hydraulic pressure acts upon both sides of the damper piston, but since the piston area is unequal from side-to-side, unequal forces are generated that cause the piston to move in the direction of the net force to position the blade.

When the rotor is turning, the forces on the piston are still unequal, but are negligible compared to the forces that are generated by the lead/lag movement of the blade. Therefore, in flight the damper functions as a damper and not as an actuator.

In the case of an equal piston-area damper, damping can be achieved simply by venting fluid from one side of the piston to the other through an orifice. However, as an unequal piston-area damper strokes, one side expels more fluid than the other can ingest—causing pumping. On the alternate stroke, one side expels less fluid than the other side can ingest—causing cavitation. Therefore, a poppet valve is provided in the damper and works under positive hydraulic pressure to accommodate the pumping action and prevent cavitation. The operation of the poppet valve in an unequal piston-area damper/positioner is known in the art and is described, for example, in U.S. Pat. No. 3,212,584 (Young, 1965) entitled DAMPER AND POSITIONER. The accumulator which is used for positioning is also used to provide the positive hydraulic pressure for damping. Even though the pressure required for positioning, typically 1000 psi, far exceeds the pressure needed for damping, the excess pressure does not interfere with the damping mode. Since the accumulator provides the positive hydraulic pressure through a common line to each blade damper, the rupture of a hydraulic line or the failure of a single seal can cause a failure of the entire damping system.

DISCLOSURE OF INVENTION

Therefore, it is an object of this invention to provide a backup source of positive hydraulic pressure for each damper and to isolate each damper from the others so that a failure in one part of the system does not render the entire system inoperative without interfering with the normal function of the system in either its damping or positioning modes.

According to the invention, a back-up mode of operation is provided for a lead/lag damping system in a helicopter that provides blade damping when the rotor is turning and that provides blade positioning when the rotor is not turning. In normal operation, a main accumulator provides fluid under pressure to the unequal piston-area dampers for each blade. In the positioning mode, the dampers respond to the pressure from the main accumulator and position an associated blade against a lead (or lag) stop. In the damping mode, the dampers respond to the lead/lag motion of a blade and provide damping therefor. As a result of the unequal piston area, in the damping mode the damper causes fluid excursions to and from the main accumulator where they are reacted to prevent pumping or cavitation.

The pressure in the system during normal operation is high and maintains open shutoff valves which are interposed between the main accumulator and each damper. When pressure drops due to a failure, the shutoff valves close to isolate each damper from the rest of the system. This is the failure mode. A backup accumulator is connected to each damper to provide a minimum amount of positive hydraulic pressure to each damper in the failure mode, thereby preventing pumping or cavitation. In the event that excess fluid is trapped in a damper at the onset of the failure mode, a relief valve vents the excess when a subsequent lead/lag stroke causes more pressure than the backup accumulator can react, thereby preventing hydraulic lock. The relief valve is disposed to vent the excess fluid to the main accumulator side of the shutoff valve to prevent fluid loss in the case of relief valve leakage during normal operation. The system may be provided as separate components or as a single unit to reduce hardware and connections and increase reliability.

The foregoing and other objects, features, and advantages of the present invention will become more apparent in the light of the following detailed description of an exemplary embodiment thereof.

BEST MODE FOR CARRYING OUT THE INVENTION

Figure 1:
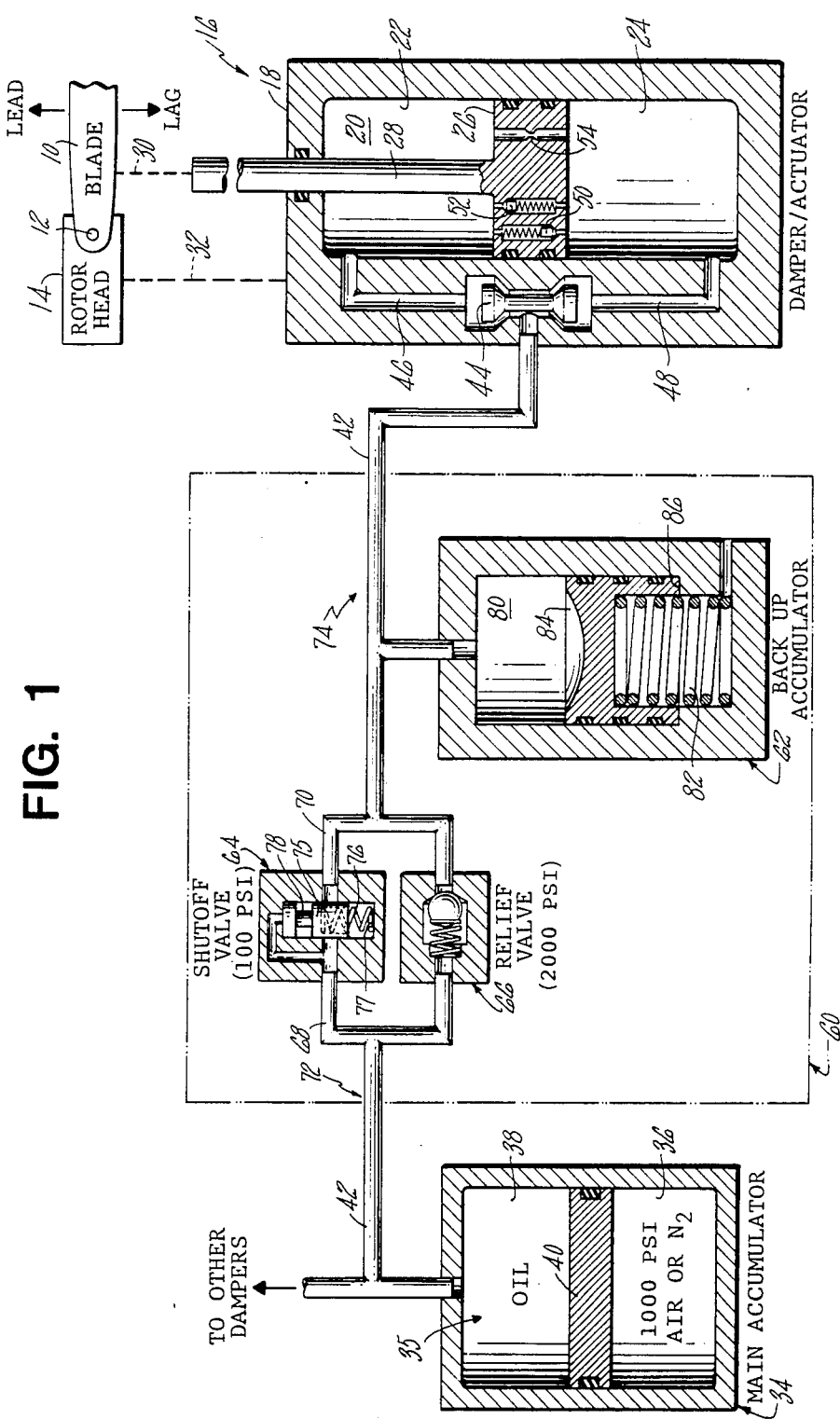
FIG. 1 is a schematic block diagram of the backup damper system of this invention.

FIG. 1 shows herein is shown a rotor blade 10 mounted by a pivot 12 to a rotor head 14, thereby allowing for lead/lag movement of the blade 10. The invention is applicable to a many-bladed rotor. An unequal-area damper 16 is connected between the blade 10 and the rotor head 14 for damping motion therebetween in a damping mode and for providing motion therebetween in a positioning mode. The damper 16 is a hydraulic unit comprising a housing 18 and a cylinder 20 that is divided into two chambers 22,24 by a piston 26. A rod 28 is attached to the piston 26 to transfer motion thereto and therefrom through the housing 18, and is connected to a suitable linkage 30 to the blade 10. The housing 18 is connected by a suitable linkage 32 to the rotor head 14.

In the positioning mode, the damper 16 is operable to move the blade 10 relative to the rotor head 14, typically against a lead (or lag) stop, in order to position the blade 10 in a predetermined manner prior to blade folding when the rotor is stopped. It is also useful to position the rotor blades when the helicopter is in the water so that the blades will assume a balanced configuration. The force for blade positioning is supplied by a main accumulator 34 that has a cylinder 35 having two spaced chambers 36, 38 that are separated by a floating piston 40. One of the spaced chambers 36 is pressurized with air or nitrogen at 1000 psi to pressurize oil in the other chamber 38 which is connected by a fluid communicating line 42 to the damper 16. An exemplary accumulator is disclosed in U.S. Pat. No. 4,305,284 (Rybicki et al., 1981) entitled METHOD AND MEANS FOR INDICATING FLUID LEVEL BY FLUID PRESSURE. A poppet valve 44 is disposed in fluid communication with the line 42, and with the chambers 22,24 via passages 46,48 respectively. The poppet valve 44 allows for flow between the line 42 and both of the passages 46,48, but it does not permit flow from one passage to the other, in other words, from one chamber to the other.

When the line 42 is pressurized, the chambers 22,24 are pressurized equally. Due to the rod 28, the area on one side of the piston 26 is less than the area on the other side. Therefore, equal fluid pressure in the chambers 22,24 exerts unequal forces on the piston 26 causing it to move in response to a net force in the direction of the greater force. When the rotor is not turning, the net force moves the piston 26 until either the blade hits a lead/lag stop. The blades can then be folded, with the lead/lag position of each blade fixed in a predetermined position.

In the damping mode, the rotor turns and the blade 10 goes through one lead/lag cycle per revolution. The piston 26 follows the lead/lag motion by moving longitudinally within the cylinder 20. Although positive hydraulic pressure is supplied from the line 42 and imparts a net force on the piston 26, the lead/lag forces are orders of magnitude greater. The piston 26 has located therethrough from one face to the other a passageway having a one-way check valve 50, another passageway having an oppositely oriented one-way check valve 52, and a restricted passageway 54. As the piston 26 moves within the cylinder 20 in response to lead/lag motions, damping is attained by having the fluid displaced from the chamber 22 to the chamber 24, or vice versa, through the restricted passageway 54. The restricted passageway 54 is dimensioned so as to provide the desired damping. If either the frequency or amplitude of piston movement cause the fluid pressure in either chamber 22,24 to exceed a limit, fluid can also pass through one of the check valves 50,52.

Because of the unequal piston area, on the lag stroke (shown as a downward stroke in the Figure), more fluid tends to be expelled by the chamber 24 than is ingested by the chamber 22. This causes a fluid excursion out of the damper 16 on the line 42, thereby increasing the pressure on the line 42 so as much as 1600 psi. The fluid excursion is reacted in the main accumulator 34 by a movement of the piston 40 against the spring force of the air in the chamber 36. On the lead stroke, less fluid tends to be expelled by the chamber 22 than is ingested by the chamber 24. This causes a lessening of pressure in the line (as low as 600 psi), in other words, a fluid excursion into the damper 16, which is reacted in the main accumulator by a yielding of the piston 40 to the air spring force, thereby forcing some of the fluid from the chamber 38 to the line 42 to prevent cavitation in the damper 16.

The main accumulator 34 is connected to a damper for each blade. Its displacement is based on the number of blades (i.e., the number of dampers), the normal piston movement for lead/lag motion, the piston movement required for positioning and the displacement of the dampers. Typically, the main accumulator is large, and is located in the rotor shaft (not shown) with the oil chamber 38 above the air chamber 36, as shown.

Since all of the dampers (one per blade) are connected in common to the main accumulator, a failure either in a damper, in the line associated therewith, or in the main accumulator creates a dangerous situation. First, due to the pressure in the air chamber 36, the fluid in the chamber 38 would be immediately discharged through the failure, causing the piston 40 to "bottom-out" at its empty position, thereby rendering the main accumulator 34 inoperative to provide positive hydraulic pressure to any of the dampers. As a result of the loss of system pressure, for each lead/lag cycle a damper would expel oil and ingest air. Eventually, the pumping action would cause a siphoning or draining of all dampers, regardless of their relationship to the original failure. Therefore, the backup accumulator system of this invention isolates each damper from the rest of the system to prevent a failure in one part of the system from causing a loss of damping to all blades.

The backup accumulator system 60 of this invention is provided in the line 42 between each damper 16 and the main accumulator 34. It is preferable to locate each backup accumulator system 60 as near as possible to its associated damper.

A shutoff valve 64 has an inlet 68 and an outlet 70 and is interposed in the line 42 between the main accumulator 34 and the damper 16 to divide the line 42 into two segments: an upstream segment 72 connected in fluid communication to the main accumulator 34 and a downstream segment 74 connected in fluid communication to the damper 16. The shutoff valve 64 is operable to permit or prohibit fluid flow between the upstream segment 72 and the downstream segment 74 depending upon whether the pressure in the upstream segment 72 is either at least or below a threshold pressure such as 100 psi. In normal operation the valve 64 is open in response to the oil pressure (1000 psi) from the main accumulator 34 so that fluid communication is normally permitted between the inlet 68 and the outlet 70. However, when the pressure in the upstream segment 72 falls below 100 psi as a result of a failure anywhere in the damping system, the isolation valve 64 closes, thereby prohibiting fluid communication between the inlet 68 and the outlet 70 and initiating the backup mode of operation.

The valve 64 is any suitable valve that fulfills the function described, such as the piston-type valve shown. Therein, pressure from the inlet 68 is ported atop a piston 75 to exert a downward force thereon. The force is opposed by a spring 76 that establishes the threshold pressure (100 psi). In normal operation, the spring force is overcome and the piston 75 is forced downward against a stop 77, thereby causing a radial passageway 78 in the piston 75 to be in register with the inlet 68 and outlet 70 and permitting fluid flow therebetween. In the backup mode, the spring force exceeds the hydraulic pressure and moves the piston upward (position shown), so that fluid flow between the inlet 68 and outlet 70 is prohibited.

Figure 2:
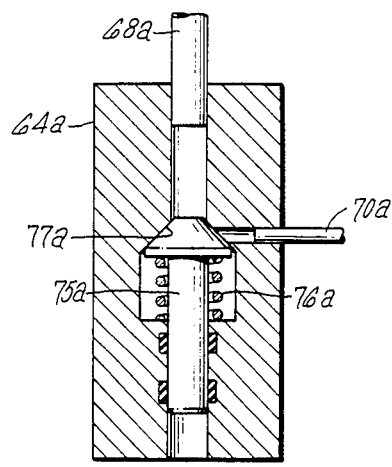
FIG. 2 shows an alternate shutoff valve.

An alternate embodiment for the valve 64 is shown in FIG. 2. Therein a closure member 75a is held by a spring 76a against a seat 77a so as to prohibit fluid flow between the inlet 68a and the outlet 70a in the backup mode. Under normal operation, pressure in the upstream segment 72 overcomes the spring force so as to open the valve 64a.

In the case of a loss of hydraulic pressure in the system, such as a hole in the main accumulator 34, the shutoff valves 64 should all close when the pressure drops to 100 psi, thereby isolating each damper 16 and associated backup accumulator 62. Of course, if the leak is downstream of a particular valve 64, the associated damper will eventually empty itself despite valve closure.

Simply isolating a damper is not sufficient to provide for proper damping in the backup mode of operation. Therefore, a backup accumulator 62 is connected to the damper 16, in other words, connected to the damper side of the shutoff valve 64. The backup accumulator 62 provides a minimum amount of positive hydraulic pressure to the damper 16 and also reacts fluid excursions therefrom to prevent pumping and cavitation. Since positioning isn't a concern, but flying the aircraft is, the amount of pressure needed for backup mode damping is very small, on the order of only a few, such as five to twenty, pounds per square inch.

The backup accumulator 62 has a cylinder 80 and a piston 84. A spring 82 exerts the force on a piston 84, which corresponds to the pressure exerted by the piston 84 on the fluid in the cylinder 80. Since the pressure exerted by the piston (5 to 20 psi) on the fluid in the cylinder is smaller than the fluid pressure (1000 psi) that is normally provided by the main accumulator 34, in the normal operating mode the piston 84 is "bottomed out" against a stop 86, and the cylinder 80 is full of fluid. This means that the piston 84 does not normally move and should remain virtually free of wear. In the backup mode, the pressure in the downstream segment 74 drops, and the backup accumulator 62 reacts fluid excursions from the damper 16 in the same way that the main accumulator 34 reacts fluid excursions under normal operation in the damping mode. In other words, the piston 84 moves against the force of the spring 82 when the fluid is expelled from the damper 16 and the piston 84 moves oil from the cylinder 80 to the damper 16 via the downstream segment 74 in response to the force of the spring 82 when fluid is ingested into the damper 16.

Should a failure occur when the damper 16 is at the lead end of its travel, on the subsequent lag stroke maximum amount of fluid would be expelled from the damper 16. In order to prevent hydraulic lock, a relief valve 66 is disposed in fluid communication with the backup accumulator 62 for relieving excess pressure therefrom. The pressure at which the relief valve 66 relieves fluid is established sufficiently high (e.g., 2000 psi) so that under normal operating conditions, when fluid excursions cause pressure in the line up to 1600 psi, the relief valve 66 will not vent any fluid from the system. Although in the backup mode it is not critical where the excess fluid is vented, it is preferable to vent the excess fluid from the relief valve 66 to the upstream segment 72 so that any leakage in the relief valve 66 during normal operation will not result in a loss of fluid from the system.

The spring rate for the spring 82 is calculated to produce at least a minimum pressure in the downstream segment 74 when the spring 82 is fully extended. The pressure will be greater when the spring 82 is compressed. The minimum pressure must therefore be chosen to create enough positive pressure on the damper to prevent pumping and cavitation. As it turns out, very little pressure is required to achieve this result. The displacement of the cylinder 80 is calculated so as to be adequate to receive the amount of fluid that would be displaced by a simple damper 16 going from full lead to full lag position. This provides more than enough capacity for normal flight. The displacement may be calculated so that a particular backup accumulator 62 can be used in conjunction with various dampers.

To reduce hardware and increase reliability, the backup accumulator 62, the shutoff valve 64, the relief valve 66, and even the damper 16 can be manufactured as a single unit, although they have been shown separately herein for clarity of description. Each of the pistons 26, 40, 84 is sealed against leakage within its respective cylinder 20, 35, 80 by appropriate seals or rings.

The various pressures enumerated herein were chosen to illustrate the relationships therebetween (i.e., which pressures are greater than which) and, while indicative of the pressures for a particular system, may vary according to the particular hardware and application involved.

The foregoing description of this invention is intended to enable those skilled in the art to practice the invention. Various other embodiments and modifications as are suited to the particular use contemplated will become apparent upon examination and practice of the invention.

What is claimed is:

1. A method of providing a backup mode of operation for a hydraulic system including unequal piston-area dampers and a common main accumulator for providing positive pressure thereto, comprising:
   interposing a shutoff valve between each damper and the main accumulator; and
   connecting a backup accumulator to each damper on the damper side of the associated shutoff valve for providing a positive pressure thereto in the backup mode;
   wherein the shutoff valves are open to permit fluid communication between the main accumulator and the dampers during normal operation, and are closed to prohibit fluid communication between the main accumulator and the dampers in the backup mode of operation.

2. A method according to claim 1 wherein the backup accumulators are rendered passive in the normal operating mode due to the pressure provided by the main accumulator.

3. A method according to claim 1 wherein the shutoff valves operate automatically, in response to the main accumulator pressure so that they are open when the main accumulator pressure exceeds a threshold pressure and are closed when the main accumulator pressure is below the threshold pressure.

4. A backup system for a hydraulic damping system including a plurality of unequal piston area dampers (16) in fluid communication with a common main accumulator (34), comprising:
   a plurality of shutoff valves (64), each interposed between an associated damper (16) and the main accumulator (34) for permitting fluid communication therebetween in a normal operating mode and prohibiting fluid communication therebetween in a backup operating mode in response to fluid pressure supplied by the main accumulator (34); and a plurality of backup accumulators (62), each connected to an associated damper (16) for providing positive hydraulic pressure thereto in the backup mode of operation.

5. Apparatus according to claim 4 characterized in that the main accumulator (34) provides a first hydraulic pressure, the backup accumulator (62) provides a second hydraulic pressure, and the shutoff valve (64) opens above and closes below a third hydraulic pressure which is greater than the second hydraulic pressure and less than the first hydraulic pressure.

6. Apparatus according to claim 5, characterized by a plurality of relief valves (66), each connected to a backup accumulator (62) for venting fluid therefrom at a fourth pressure that exceeds the first pressure.

* * * * *